United States Patent [19]
Whalen et al.

[11] 3,802,932
[45] Apr. 9, 1974

[54] SOLID STATE METHOD FOR CONVERTING SMALL PIECES OF STEEL TO A WORKPIECE

[75] Inventors: Mark E. Whalen, Pepper Pike; Joseph W. Malleck, Chagrin Falls, both of Ohio

[73] Assignee: Republic Steel Corporation, Cleveland, Ohio

[22] Filed: July 21, 1971

[21] Appl. No.: 164,789

Related U.S. Application Data
[63] Continuation-in-part of Ser. No. 122,110, March 8, 1971.

[52] U.S. Cl.................... 148/12.1, 29/403, 29/420, 264/111
[51] Int. Cl. ........................... B22f 3/16, B22f 3/18
[58] Field of Search......... 75/0.5 BA, 226; 264/111; 148/12.1; 29/403, 420

[56] References Cited
UNITED STATES PATENTS
1,491,392  4/1924  Graham ............................... 75/226
2,289,570  7/1942  Boeghold....................... 75/0.5 BA

*Primary Examiner*—W. W. Stallard
*Attorney, Agent, or Firm*—Watts, Hoffman, Fisher & Heinke

[57] ABSTRACT

A method is disclosed for converting scrap or other small pieces of steel into a useful, commercial product while maintaining the steel in a solid state. According to the process, pieces of scrap steel are baled together into a bale in which the scrap pieces of random size and shape become intertwined together. The bales are heated in a reducing atmosphere so that carbon migrates from the scrap steel. The heated bales are impacted, while heated, to produce a steel body which is thereafter subjected to continued impaction so that the pieces forming the body are welded together into cohesive, homogeneous slab of low carbon steel.

21 Claims, 9 Drawing Figures

SOLID STATE METHOD FOR CONVERTING SMALL PIECES OF STEEL TO A WORKPIECE

CROSS REFERENCED APPLICATIONS

This is a continuation-in-part of U.S. Patent Application Ser. No. 122,110 filed on Mar. 8, 1971 by Mark E. Whalen et al. entitled NOVEL APPARATUS AND SOLID STATE METHOD FOR CONVERTING SMALL PIECES OF METAL TO A WORKPIECE.

U.S. Pat. Application Ser. No. 121,861 filed Mar. 8, 1971, now U.S. Pat. No. 3,744,118 by Mark E. Whalen et al. entitled SOLID STATE METHOD FOR CONVERTING SMALL PIECES OF METAL TO A WORKPIECE.

U.S. Pat. Application Ser. No. 164,788 filed July 21, 1971 concurrently by Mark E. Whalen et al. entitled METHOD AND APPARATUS FOR SOLID STATE METAL CONVERSION.

BACKGROUND OF THE INVENTION

1. Field of the Invention

This invention relates to apparatus and a method wherein scrap metal pieces are converted to a body of solid metal useful in a manufacturing operation.

2. The Prior Art

It is well known that in conventional commercial processes for the conversion of scrap steel to commercial steel, the scrap metal is melted and then processed with conventional steelmaking techniques. Except for the melting step, such scrap conversion does not employ any processes which are uniquely demanded by the presence of scrap.

It has long been recognized that scrap metal, particularly a type known as "prompt industrial" resulting from automotive car body stampings, is of high quality and that there should be some method of utilizing it as a raw material without the expense of returning it almost to the start of the conventional steelmaking cycle. This recognition has led to proposals for the conversion of scrap steel into a useful solid-steel product while maintaining the steel in its solid state. While there have been a number of such proposals, none has achieved commercial acceptance. While there are many contributing factors in the failure of prior proposals, the principal factors are believed to be:

1. Where it has been proposed to continuously compress pieces of scrap together to cause them to weld into a useful product, there has not been a recognition of the need for inhibiting dissipation of the compressive forces laterally with respect to planes in which the forces are applied and particularly with respect to the utility of strain rate control.
2. The processes were such as to degrade rather than enhance the qualities and properties of the steel raw material with the result that the finished product, if one could be achieved at all, was of little commercial value.
3. There has been a failure to properly select and segregate scrap so that the scrap used as raw material is compatible to produce a good quality finished product from a solid state process.
4. Prior proposals to convert scrap to solid steel via compression have not sufficiently reduced the thickness of a given volume of scrap to achieve full homogeneity and welding of the components.
5. In some prior proposals the scrap has been heated over relatively long periods which, in some circumstances, has resulted in migration of manganese oxide to the surface of the scrap pieces. This migration has tended to result in stratification of the manganese oxides in the final product which has adversely effected some physical properties.
6. The exposure of the scrap to heat in furnaces has been such that optimum heat transfer characteristics have not been achieved due to physical geometry and location of the scrap and to organization of furnace elements such as burners.

SUMMARY OF THE INVENTION

The methods and apparatus of the present invention allow great latitude in (1) the selection of the quality of the steel to be produced by the process; (2) the proximity of the scrap to the location where the useful steel is produced; (3) the source of pieces to be converted to a useful product by a solid state process; and (4) the required capital investment which can vary materially according to the quality and the quantity of product to be produced. Furthermore, the present invention enables denitriding and decarburization of the scrap material so that the homogeneous end product has a lower carbon content than the scrap material used in the process.

While there may be many variations in the process, in any of its forms it includes the steps of:

1. Maintaining pieces of metal together for further processing.
2. Heating the pieces of metal in a reducing atmosphere.
3. Impacting the pieces while hot to produce a metal body and thereafter continuing the impaction of the body so that the pieces forming the body are welded together into a cohesive, homogeneous slab.

Since there are many variations according to the conditions encountered, a particular situation is selected to trace the process through in a preferred system for making high-quality steel from scrap. Specifically, many automotive stamping plants use very high quantities of high-quality sheet steel. These plants produce, as a result, relatively large quantities of steel scrap which is of fairly uniform chemical consistency. In converting the scrap to useful steel, scrap having a chemistry suitable for the desired finished product is segregated. The scrap is taken to balers where it is mechanically compressed into bales. The bale is then sprayed with oil to protect the scrap against oxidization during transit to a location where the bales are converted to usable commercial steel.

In this example of the present invention, the baling is important. By utilizing baling techniques with an admixture of sizes and shapes of pieces of scrap, the scrap itself becomes interlaced and intertwined to provide a cohesive body. The cohesiveness of the body contributes to the inhibition of force dissipation when the body is impacted. Thus, the interlocking pieces of scrap themselves resist force dissipation longitudinally of the bale as the bale is progressively compressed in a peripherally constraining manner for cross sections advancing through the press. Further, the interconnected scrap pieces produce a truss effect in the bales so that the bales can withstand substantial bending stresses while not without failure. This simplifies handling of the bales during the process.

The bales are transported to a furnace and heated to from 1,400°F to 2,000°F for a subsequent conversion of the bale to a slab of homogeneous steel. It should be noted that while this is a practical commercial range, temperatures of from 1,292°F to melting can be employed.

The furnace is provided with a reducing atmosphere generated by the combustion of natural gas with 45% – 50% stoichiometric oxygen so as to achieve a terminal temperature at the coolest part, or core, of the bale of greater than 1,300°F and preferably about 1,600°F.

It has been discovered that heating the bales in a reducing atmosphere effects a reduction in the carbon content of the baled steel without first requiring the bales to be heated in an oxidizing atmosphere. Hence the resultant steel produced by the process has deep drawing qualities which are improved over those of the scrap used in the bales. It is believed that the carbon migrates from the steel scraps under the heavy reducing atmosphere due to the reduction of oxygen in solution in the steel. It is believed that dissolved oxygen and carbon leave the steel and form CO in the furnace atmosphere. This phenomenon may also be partly explained by the fact that the bale is quite porous and may contain trapped air within it which is available for combination with the carbon in the furnace. In order to assure that this molecular migration and combination occurs, the scrap gauge thickness is preferably maintained at or below 0.10 inch for 90% average and the steel temperature above 1,292°F, the carburization risk temperature of the steel. It has also been found that the bale density can be no more than 65% dense for effective and commercial decarburization to occur.

The reducing atmosphere in the furnace is substantially free from nitrogen so that in addition to decarburizing the steel scrap during heating, the scrap nitrogen content of the steel is also reduced. This further encourages the deep drawing qualities of the homogeneous steel end product.

Manganese oxide migration to the surface of the scrap pieces during heating occurs if the bales are heated in the furnace longer than about 1.6 hours. According to the invention, scrap bales are heated to desired working temperatures before manganese oxide migration occurs. The scrap bales are formed having such density, size and shape that their heat transfer coefficient approaches the heat transfer coefficient of solid steel. As noted, the bales are generally porous and preferably have densities generally in the range of 30% – 65% of a solid steel mass having the same size and shape as the bales. The porosity enables the furnace atmosphere to penetrate the bales to transfer heat to the interior of the bales by convection. The bales are also heated by radiation and reradiation and by conduction. As a result of these three modes of heat transfer the bales exhibit an overall heat transfer coefficient, throughout the heating range, of about 70% that of solid steel.

If decarburization and denitriding are not desired, the bale density can be increased above 65%. Regardless of desired chemical reactivity it has been found that heat transfer to the core of the bales is promoted by the scaleless heating in the reducing atmosphere. This is true because it has been found that oxides on the bale pieces insulate the pieces and slow the heating of them. Avoiding the use of an oxidizing atmosphere during heating avoids the creation in the oven of oxides on the bale pieces and therefore promotes more rapid heating since the insulative effect of furnace produced oxides on the bale pieces is obviated.

To further promote rapid heating, the present invention contemplates a furnace construction wherein gas burner flames impinge on the bales. One preferred furnace is a walking beam type furnace having gas burners above, below and at lateral sides of the bales. The burners are located so that the cores of the burner flames impinge on all surfaces of the bales as the bales are advanced from station to station through the furnace.

Another preferred furnace is a pusher type furnace wherein bales are disposed side by side and pushed through the furnace. Steel separation plates are disposed between adjacent bales for distributing the bale advancing forces and for preventing the bales from being welded together in the furnace. The separation plates have a chemical composition which is incompatible with the bale scrap steel so that welding between the plates and the bales does not occur. The separation plates are stripped from the bales when the bales emerge from the furnace.

The pusher furnace employs gas burners disposed above and below the bales with the cores of the burner flames impinging on the bales. The separation plates promote heat transfer between the adjacent bales to speed up heat transfer between them.

The new process also eliminates a "soak" period sometimes employed in the prior art to equalize the temperatures throughout the bale. According to the new process, the heating cycle ends when the core, or coolest part, of the bale reaches above 1,400°F preferably about 1,600°F. the bales are then subjected to forging regardless of the temperature differential between the outer region of the bale and the core. This procedure has been found to provide smoother hot working and better quality hot worked surfaces under continuous forging.

While under the influence of the reducing atmosphere to protect against chemical reaction of the constituents, the bale is delivered from the furnace to the entrance of a harmonic forging press for forging while hot.

The harmonic press plays an important role in successfully converting the bale to solid steel. The press has side restraints approximating the width of the original bale. This constrains the bale against lateral movement as it is forged and therefore against lateral dissipation of the forces. The platens are driven at harmonic speeds above four revolutions per second (rps). By impacting the bales at these very high speeds, the forces effect high pressure compression and therefore molecular migration and welding in planes transverse to the path of workpiece travel. The sharpness and quickness of the impactions is such that longitudinal dissipation of the impacting forces is essentially avoided. It will be appreciated that tremendous forces of typically the order of 20,000 psi and in the range of 9,800 psi to 45,000 psi must be imposed on the bale in order to effect a welding in the temperature range here involved.

The bale is forged by the press until it is in solid condition. The forging by the press continues until the thickness of the bale is reduced an additional 20 percent or more after reaching solid so that the bale leaves the press in the form of a solid slab of steel with good yield. During this forging, the bale is perimetrally restrained so that the sharp, rapid impactions by the platens impact high forces substantially in planes. These high forces in the appropriate conditions of confinement and temperature cause molecular migration and welding of the scrap into a homogeneous, unitary slab.

A principal object of the present invention is the provision of a new and improved method of making steel from scrap steel wherein the scrap steel is baled and rapidly heated in a reducing atmosphere prior to compaction of the bales into a solid steel mass.

Other objects and a fuller understanding of the invention may be had by referring to the following description and claims taken in conjunction with the accompanying drawings.

DESCRIPTION OF THE PREFERRED EMBODIMENT

Figure 1:
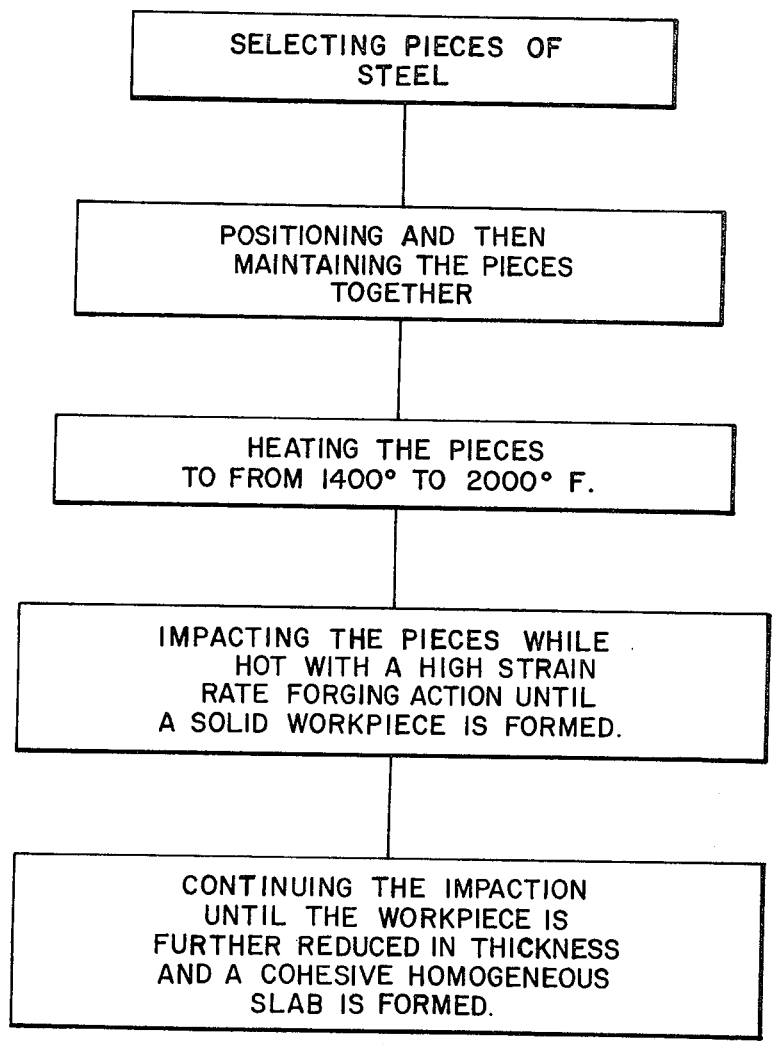
FIG. 1 is a flow diagram of the process.
Figure 2:
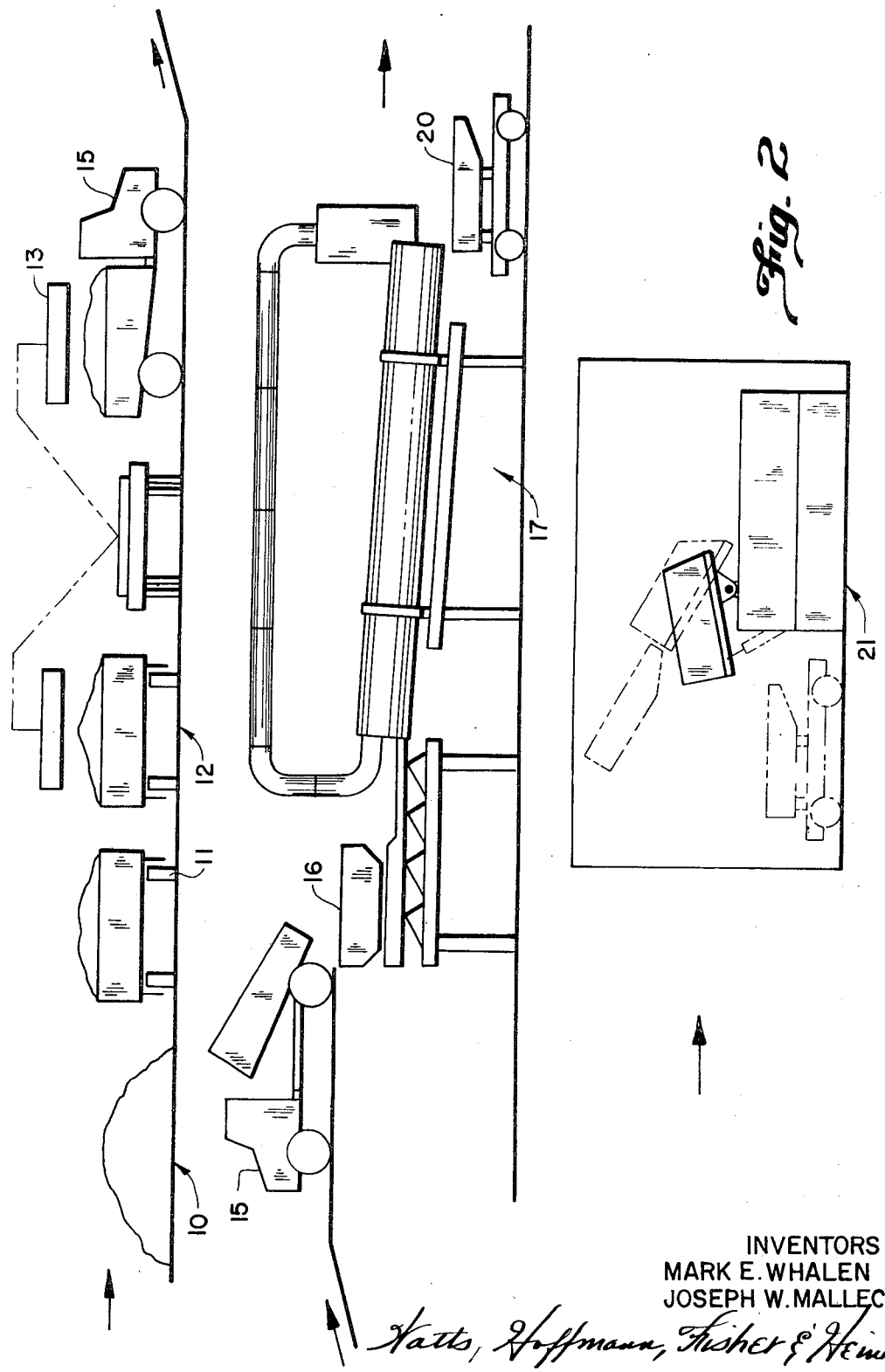
FIG. 2 is a schematic diagrammatic view of the steps performed at the location where scrap is generated including cleaning of the scrap and then baling of it.
Figure 3:
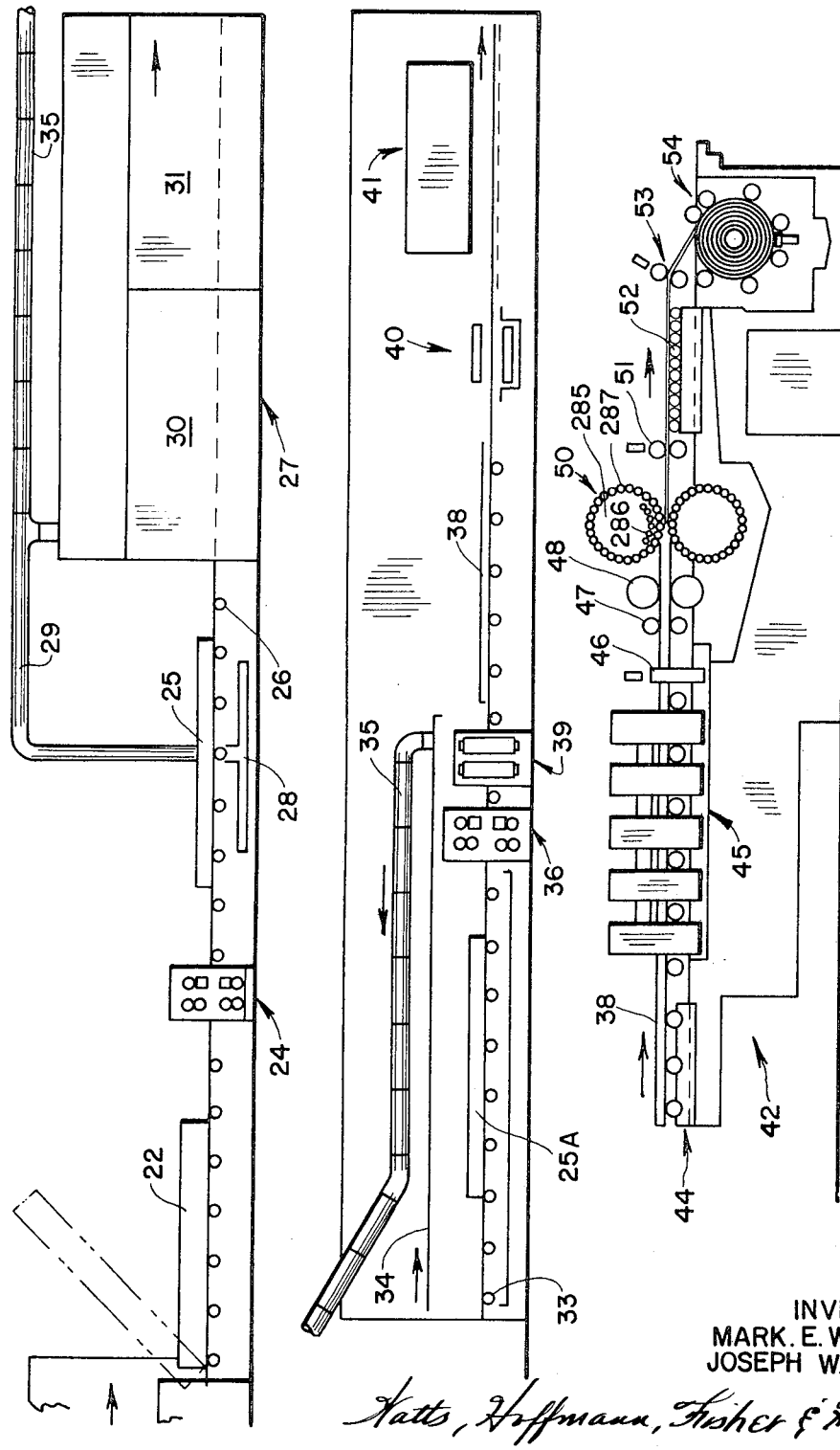
FIG. 3 is a schematic view of the processes employed in converting a bale of scrap to a coil of steel strip.

For clarity, the specification will be broken into six separate sections. These sections are:
 I. The Overall Process
 II. Baling of the Scrap
 III. Bale Heating
 IV. Bale Compaction I. The Overall Process Referring now to FIGS. 1–3, FIG. 1 is a flow diagram of the process, while FIGS. 2 and 3 together are a schematic diagrammatic view of the flow of material from scrap to finished steel sheet in a high volume application of the invention. The equipment shown there has a capacity of the order of 300 tons per hour.

Referring specifically to FIG. 2, a pile of scrap is depicted at 10. This scrap pile depicts a segregated scrap pile composed of steel scrap having a chemistry of the desired finished process. For example, the scrap ideally will be steel having a carbon content of from 0.05% to 0.5% and will be a gauge of 0.10 inch or less in random shapes.

The scrap is diagrammatically shown as loaded in a freight car 11 for transport to another location indicated at 12. At the location 12, an electromagnet 13 is shown transferring the scrap to a truck shown schematically at 15. The truck 15 then transports the scrap to a charge hopper 16 for charging the scrap into a rotary kiln shown generally at 17.

As will be explained in greater detail presently, in that situation where the finishing of conversion of the scrap to a usable solid steel product is at some location reasonably remote from the scrap source and baling operation, the rotary kiln 17 will normally not be used. The kiln 17 is ideally used in that situation where the scrap is converted to solid steel at a nearby processing plant of where a special quality finished product is desired.

The depicted kiln is one in which a reducing atmosphere of from 700°F to 1,000°F is employed. The reducing atmosphere will be composed of natural gas and oxygen with a mixture which is 45% to 55% stoichiometric. The principal purpose of the kiln is to remove oils and residues such as palm oil without producing a blue oxide on the steel. If the steel scrap is excessively oxidized or enhanced bonding at lower temperatures is desired, it is shot blasted subsequent to its treatment in the rotary kiln.

After the scrap has been cleaned in the kiln, it is transported to a baler. In FIG. 2, a transport car 20 is shown schematically for this purpose. The scrap is charged into a baler 21. Here the scrap, which is an admixture of random shapes, is compressed by a pressure of the order of 1,000 to 7,500 pounds per square inch. A cold harmonic press 24 is stationed adjacent the baler 21 for further compacting the bales if necessary. The press 24 is described in greater detail in Section VI, and is capable of pressures of from 7,500 to 45,000 or more pounds per square inch at feed rates of the order of 12 bales per hour. In processes where only moderate bale compaction is desired, the press 24 need not be used.

Bales emerging from the baler 21 and press 24 may be anywhere from 20% to 90% densified, depending on what further processing steps and equipment are to be employed. The weight of a densified bale is thus between 20% and 90% of the weight of a solid mass of steel having the same dimensions as the bale. The scrap is typically formed into a bale in the shape of a rectangular solid and weigh from 200 to 400 pounds per cubic foot.

The baling of an admixture of random shaped scrap pieces is highly important to the performance of the process of this invention. As will become more apparent presently, the baling causes the scrap pieces to become physically intertwined and interlocked to provide a bale having an inherent strength and rigidity. The strength and rigidity not only serves a more conventional function of facilitating the transport of the scrap in a condensed way, but also, more importantly, is a major factor in inhibiting longitudinal dissipation of impact forces during a subsequent forging operation. Furthermore, the bales can be supported, like a beam, at spaced locations, and support their own weight without breaking apart. The intertangled scrap pieces form a truss-like structure which accounts for this surprising resistance to beam stresses.

If the scrap, prior to baling has been cleaned in a kiln 17, it is next placed in covered railroad cars and the like for transport to the location of subsequent stages of the process. If, however, kiln cleaning is avoided as has been suggested above, it is preferred that the bales be oil immersed to protect them during shipment and then shipped to another location for further processing.

After shipment, if the bale has been oil coated for shipment, or in any event, not precleaned, a solvent cleaning with trichloroethylene may be performed in a manner which is described in greater detail in the referenced prior applications. The bale cleaning is not shown in the schematic presentations of FIGS. 2 and 3.

The cold compressed bale 22 is placed on a conveyor 26 for transport to a furnace shown generally at 27. The bale is heated to from 1,300°F to 2,000°F in a heavy reducing atmosphere provided in the furnace 27. One important feature of the invention resides in the fact that the baled steel is decarburized in the furnace without requiring a previous heating cycle in an oxidizing atmosphere. The bales should be no more than 65 percent dense for effective decarburization to take place. Another important feature resides in the rapid heating of the bales in the furnace during which the cores of the bales reach about 1,600°F within approximately 1.75 hours so that manganese oxide migration in the scrap pieces is substantially avoided.

The heated bale, identified by the numeral 25A is fed from the furnace 27 to a hot forming harmonic press 36 along another conveyor 33 under a hood 34. Escaping oven gases are channeled into the hood 34 so that the hot bale 25A is maintained in the oven atmosphere until condensed to a solid slab by the press 36. A stack 35 delivers furnace gases to the hood 34. Gases are recirculated from the hood to the furnace near its inlet or feed end.

The hot forming press 36 is used to reduce the bale until it is a solid mass of steel and thereafter to continue the reduction until it has been reduced by about 30% from its thickness when it becomes solid. As will be described in greater detail in Section VI, the hot press 36, has side restraints of a width equal to the width of the original bale dimension. Accordingly compression of the bale into a thin solid slab results in compaction and elongation, not widening.

In the hot harmonic press, the bale 25A is impacted with sharp, rapid blows. Because of the perimetral confinement of the bale by the platens and the side restraints, and because of the interaction and intertwining of the components of the bale, and because of the inertia of the mass of the bale, the forces imparted to the bale by the harmonic press platens are essentially in planes of compaction. Because the forces are confined essentially to planes of compaction, the forces serve almost exclusively to compress and weld the scrap pieces. With proper confinement and proper combination of temperature and pressure, molecular migration is achieved at abutting surfaces so that a true weld of the components of the bale is achieved and the resultant slab, shown at 38, is a homogeneous piece of solid steel.

If one wishes to form, for example, a rectangular billet rather than a slab, or otherwise reduce the transverse dimension of the work product, a side impacting harmonic press 39 is provided downstream from the press 36. The press 39 is the same as the press 36 with the exception that the impactions are from the sides rather than the top and bottom.

If the ends of the slab 38 require trimming, this can be done with either a flame or a hydraulic shear indicated schematically at 40. The slab then may be delivered to a slab piler 41. Preferably, however, the slab is transported directly, and while hot, to a mill indicated generally at 42.

The mill 42 is of the planetary type because of its compact nature, the relatively low capital investment required for its installation and —more importantly in the present disclosure — because it can take the slabs 38 while hot and roll them into sheets. This is desirable from the standpoint of inhibiting delamination of the slab which may occur if the preceding manufacturing steps have not been optimally performed in the preferred way or if the scrap is not of appropriate grade and kind.

The planetary mill 42 includes an entry table 44 for feeding the slab 38. A continues reheating furnace 45 is provided to re-elevate the temperature of the slab to its rolling temperature of up to 2,350°F if it is excessively cooled.

After the slab passes through the oven, it passes through a descaling unit 46, thence through pusher rolls 47 to feed rolls 48. The feed rolls feed the slab into the planetary assemblies 50 which achieve the rolling reduction from slab thickness to strip. The strip will be of the order of less than one-twentieth of the original dimension of the bale. The strip passes from the planetaries 50 through pinch rolls 51 across an exit table or conveyor 52 and thence through another pair of pinch rolls 53 to a coiler 54.

II. Baling of the Scrap

Figure 4:
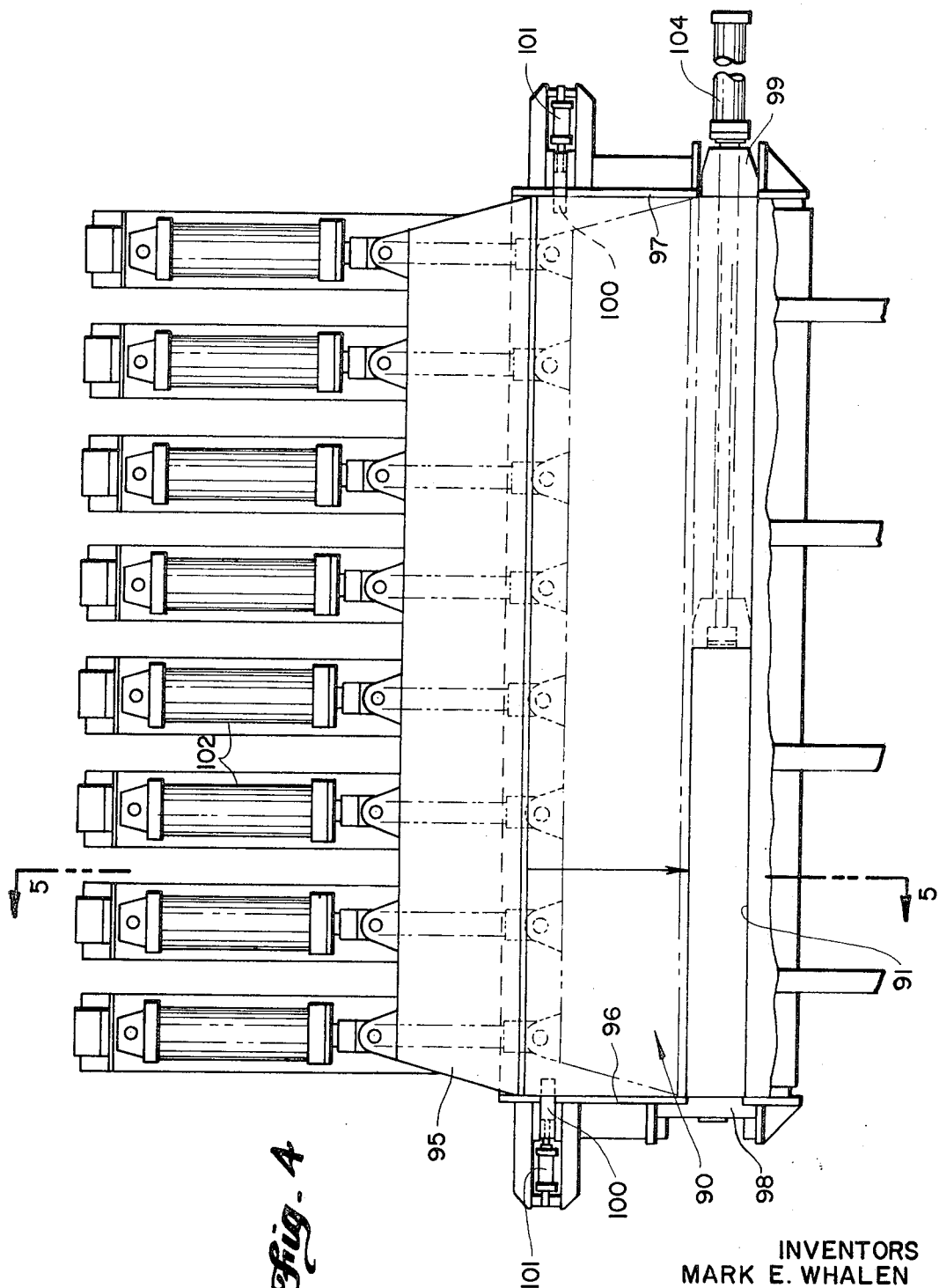
FIG. 4 is a top plan view of a baler.
Figure 5:
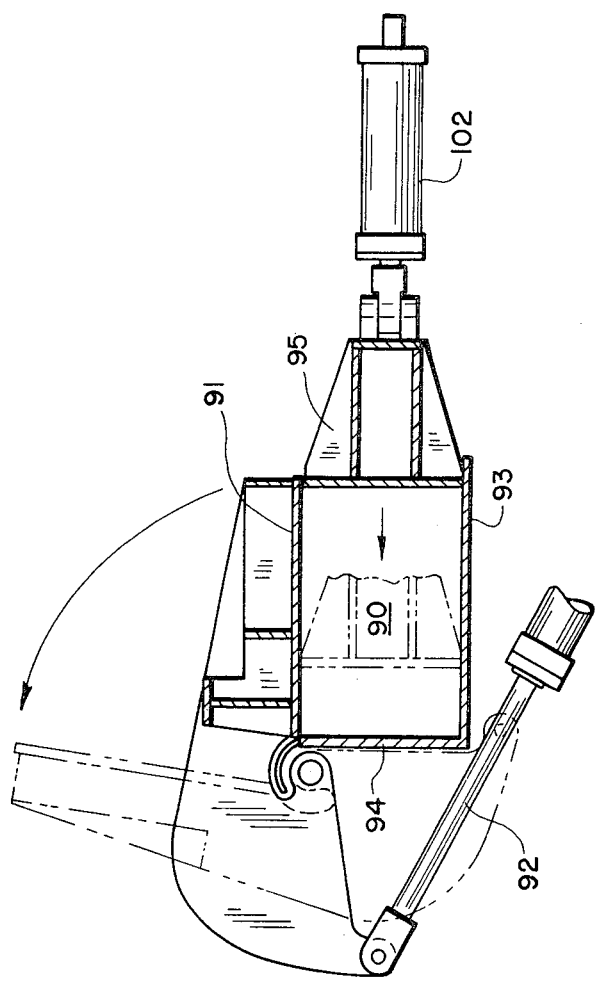
FIG. 5 is a sectional view of part of the baler as seen from the plane indicated by the line 5—5 of FIG. 4.

FIG. 4 is a top plan view of a baler 89. The baler 89 includes a charge space 90 into which scrap is charged when a baler cover 91 is open as shown in FIG. 4. Referring to FIG. 5, the baler cover 91 is shown in its closed position in solid lines and in its open position in phantom. A cover actuator 92 is provided for opening and closing the cover.

The baler charge space 90 is defined, on its bottom and one side, by fixed bottom and side plates 93, 94. These plates 93, 94 extend the length of the charge space 90. The top of the charge space 90 is defined by the cover 91 when it is closed and the other side of the charge space is defined by an elongated, movable, first stage ram 95. The first stage ram 95 extends the length of the charge space 90.

The ends of the charge space are defined in part by a pair of fixed plates 96, 97. The remaining portions of the ends of the charge space 90 are defined by a movable exit door 98 and by a second stage compaction and ejection ram 99.

In operation, the charge space 90 is filled with scrap at a time when the baler cover 91 is open. The cover is then closed. Latches 100 are then positioned to latch the cover in its closed position by energizing cover latch actuators 101. Next, the elongated ram is moved from its solid-line position of FIGS. 4 and 5 to the phantom position shown in FIG. 4. This effects a first stage compaction of the scrap in the charge space 90. This compaction is achieved by simultaneously energizing eight first-stage ram actuators 102.

After the first-stage reduction of the scrap has been accomplished, a compaction and ejection actuator 104 is energized to move the second stage ram 99 from the position shown in solid lines in FIG. 4 to the position shown in phantom. This phantom position is approximately one-half the distance between the fixed plates 96 and 97 so that a 50% reduction in bale size is accomplished in the second stage.

The bale is transferred to the press 24 for further compaction to between 30% and 65% density. The press 24 is described in greater detail in section IV. In circumstances where decarburization is not desired the bale may be compacted to densities in excess of 65%.

III. Bale Heating

To achieve bonding between scrap or metallic elements of a bale, within commercial practicality, thermal energy must be imparted to the bale so that the core or coolest portion of the bale attains a temperature in the range of 1,400°F to 2,350°F, preferably about 1,600°F. Exactly what terminal temperature is selected depends upon the designed strain rate and distributed pressures used in the hot compaction as discussed more fully in Section IV.

As is previously noted, bale heating takes place rapidly in a furnace provided with a heavy reducing atmosphere. Despite the fact that the bales are not previously heated in an oxidizing atmosphere, decarburization takes place in the furnace when the bales are composed of scrap pieces having a guage of no more than 0.10 inch and have a density of 65% or less. The porosity of bales having a density of 65% or less enables the reducing atmosphere in the furnace to permeate the bale and removal of carbon from the scrap pieces throughout the bale is accomplished. The carbon content reduction is relatively substantial, resulting in low carbon end product steel which can exhibit improved deep drawing qualities when compared to the beginning scrap material.

Although admixtures of different gauge scrap of 0.10 inch or less can be used to form the bales, a more uniform end product steel may result when all scrap forming a given bale is about the same gauge.

The furnace 27 is preferably fired by natural gas and 45% – 50% stoichiometric oxygen which produces a substantially nitrogen free reducing atmosphere comprising about 27.5% CO and 38% $H_2$ by volume. This atmosphere is preferably maintained between 2,000°F and 2,400°F. These constituents combine to form a reducing atmosphere volume of 65.5% in the furnace. The reducing agents should provide at least 40% by volume of the furnace atmosphere. This nitrogen free atmosphere also reduces the nitrogen content of the steel in the bale.

In one experimental heating cycle, a bale of plain carbon rim steel scraps having gauge thicknesses of about 0.035 inches and carbon contents ranging from 0.08% to 0.25% was subjected to scaleless heating in the above noted atmosphere in a furnace having a wall temperature of about 2,350°F. The final product had a carbon content of between 0.01% and 0.02%. Nitrogen levels were reduced from about 0.001% to below 0.001%.

The mechanism by which decarburization takes place during the heating cycle is not completely understood. One theory is that oxygen in solution in the scrap leaves the metal under the influence of the reducing atmosphere which is receptive to oxygen. The carbon in solution is reduced in relation to the reduction in dissolved oxygen and migrates into the reducing atmosphere where it combines with oxygen to form CO. Another possibility is that atmospheric air is trapped in the interstices of the bales so that as the bale is heated, the oxygen in the air combines with carbon migrating from the bale scrap. Experimental data shows that decarburization of the total mass of steel is maximized and that scrap thicknesses greater than 0.1 inch should be avoided if substantial decarburization is desired. when the individual scrap piece thickness is minimized and that A problem encountered in processing bales of scrap steel has been the tendency of manganese oxide in the scrap to begin to migrate to the surfaces of the scrap pieces when the heating cycle has a duration of greater than about 1.6 hours. When such migration occurs over periods in excess of 1.75 hours, concentrations of manganese oxide are located at the junctures of scrap pieces when the heated bales are compacted to solid. This adversely effects the quality of the slab of steel produced by the process.

According to the invention, the heating cycle time is reduced by increasing heat transfer to the bales such that the bales can reach desired temperatures before substantial manganese oxide migration occurs.

Among the steps taken to increase the heating rates of bales have been: (1) control of the minimum dimension of bales regardless of length or width to provide an optimum heat path length from the bale surfaces to its core; (2) direct impingement of furnace burner flame cores on surfaces of the bales; and (3) heating only in reducing atmospheres to avoid oxide formations on the bales which would otherwise produce an insulative effect.

The ability to rapidly heat a bale of scrap steel to a minimum temperature of 1,600°F in about 1.6 hours or less has been questioned by experts on the theory that the porosity of the bales produces an insulative effect which would prevent rapid heat transfer from the bale surfaces to its core. Actual testing has shown that bales of scrap steel are capable of rapid heating and that heating of the bale core occurs by three modes of heat transfer, i.e., conduction, convection and radiation. Conduction occurs between the engaged scrap portions. The porosity of the bale enables hot furnace gases to permeate the bale thus transferring heat to the interior of the bale by convection. Radiant heat moves to the core by radiation and reradiation between closely spaced scrap portions in the bale.

In actual tests conducted on a 16 inch by 16 inch bale having a density of about 40%, the observed overall, or effective, heat transfer coefficient for the bale, in heating the core from ambient temperature to 1,600°F was about 80% of the heat transfer coefficient of 1010 carbon steel. It should be noted that the actual instantaneous heat transfer coefficient for the bale probably varies throughout the heating range due at least in part to differing temperatures and temperature differentials throughout the bale. It has been determined from the testing that bales having a smallest dimension of about 26 inches, regardless of the other dimensions, can be heated to a core temperature of about 1,600°F in about 1.75 hours. This heating period has been found sufficiently short to preclude any substantial manganese oxide migration.

The heating cycle is performed in natural gas fired furnaces constructed so that the cores of the burner flames impinge on the bale surfaces, thus maximizing the efficiency of the heat input to the bales. The bales are preferably heated in a walking beam type furnace 27A, shown schematically in FIGS. 7 and 6, or in a pusher type furnace 27B shown in FIG. 8.

Figure 6:
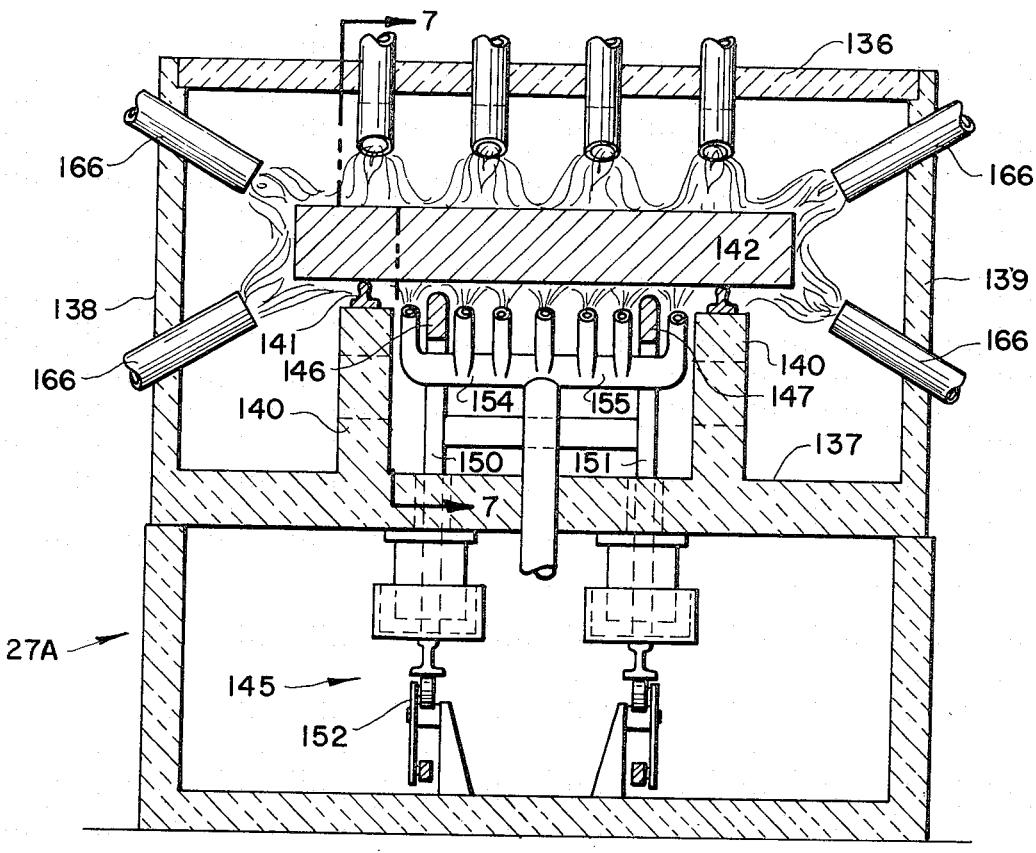
FIG. 6 is a transverse cross sectional view of a walking beam furnace constructed according to one aspect of the invention.
Figure 7:
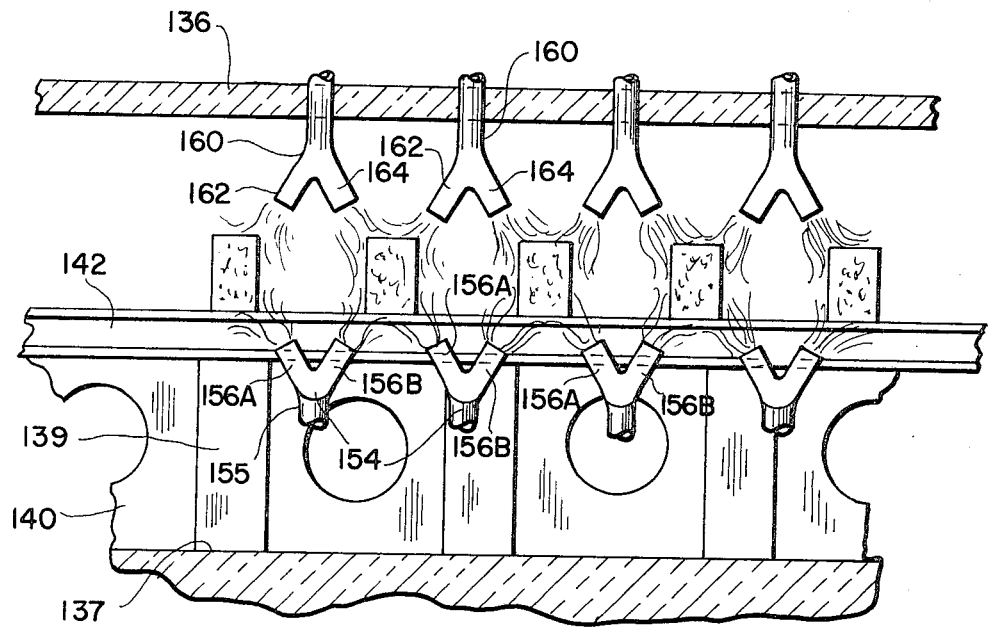
FIG. 7 is a cross sectional view seen approximately from the plane indicated by the line 7—7 of FIG. 6 with portions removed.

The walking beam furnace 27A may be of any conventional or suitable construction and is shown somewhat schematically in the drawings. As shown in FIG. 6, the furnace 27A comprises a top wall 136, a floor 137 and side walls 138, 139. Columns 140 project from the floor and support rail-like skids 141, 142 at their upper ends. The skids 141, 142 extend parallel to each other throughout the length of the furnace and support spaced bales bewteen them.

A walking beam mechanism 145 is associated with the furnace and comprises parallel rails 146, 147 supported in the furnace adjacent the skids 141, 142 and extending the length of the furnace. The rails 146, 147 are each supported by a plurality of stanchions 150, 151, respectively. The stanchions 150, 151 extend from the respective rails through openings in the furnace floor to an actuating mechanism 152 which moves the rails and stanchions vertically and horizontally to advance the bales through the furnace. The mechanism 152 is illustrated and described in detail in the parent application to Whalen et al., Ser. No. 122,110 and reference should be made to that application for an understanding of the actuating mechanism. Suffice it to say that bales advancing through the furnace 27A are moved through a series of successive predetermined positions by the walking beam rails, the rest in the predetermined positions on the skids.

The furnace 27A employs gas burners which are oriented so that the cores of the burner flames impinge directly on the bale surfaces. The burners are stationed above, below and on opposite lateral sides of the bales in the furnace. The lower burners 154 each define a manifold 155 from which a plurality of nozzles 156 project. Two banks 156A, 156B of nozzles (FIG. 7) are associated with each manifold and the banks of nozzles are constructed to direct their flames upwardly at an angle with respect to vertical. The burners are located in the furnace so that the burner flames impinge on the leading lower corner and trailing lower corner of successive bales during the periods that the bales are resting on the skids. The cores of the burner flames impinge on the bale surfaces and flow along the bottom face and vertical side faces of the bale.

The top burners 160 extend from the ceiling of the furnace at laterally spaced locations across the furnace. Each top burner is generally Y shaped with the arms of the Y forming nozzles 162, 164 which direct their flames in divergent downward directions. The burners 160 are positioned in the furnace so that the flame cores impinge on upper trailing corners and upper leading corners of successive bales in their rest positions on the skids. The flame cores thus flow across the upper top surfaces of the bales as well as downwardly along the bale side faces.

Side burners 166 project from the side walls of the furnace and are positioned to impinge their flame cores on upper and lower end corners of each bale so that the end faces of each bale are heated by direct impingement by these burner flames.

Bales having a 30% density and dimensions of 26 inches by 60 inches by 14 feet have been found to have a hot strength of at least 800 psi and are thus self supporting when spanning furnace skids which are 8 feet apart. In the illustrated walking beam furnace, the minimum cross sectional dimension of the bale forms the top and bottom faces. This bale orientation minimizes the beam stresses in the bale and assures adequate strength for self support at elevated bale temperatures.

Figure 8:
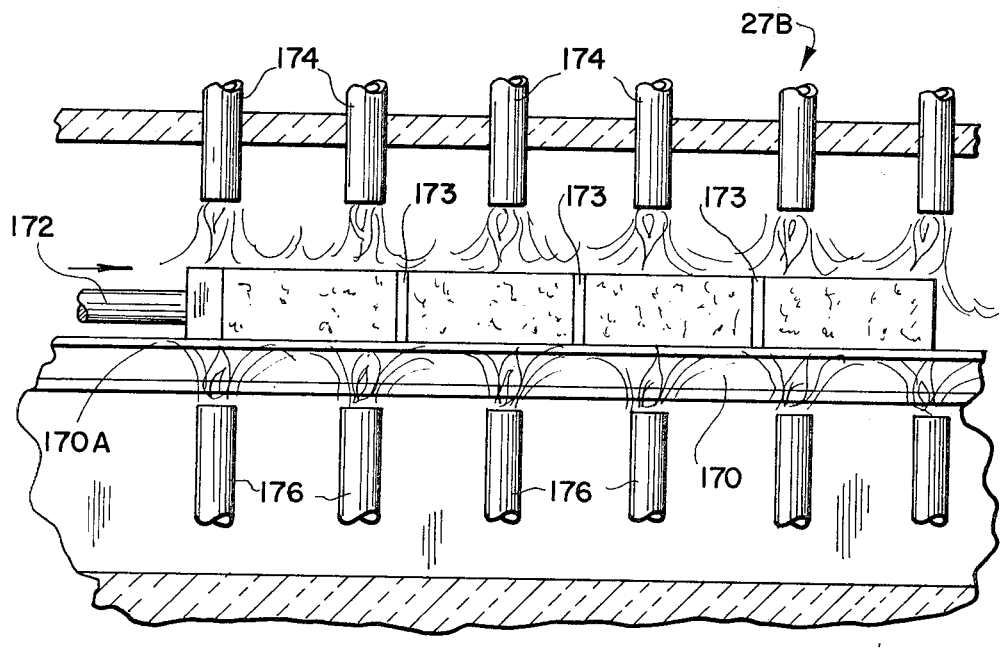
FIG. 8 is a longitudinal cross sectional view of a pusher type furnace for heating bales according to the invention.

Referring now to FIG. 8, the pusher type furnace 27B is schematically illustrated as defining a floor 170 along which bales are advanced by a ram 172.

The bales are placed in the furnace with their longitudinal extents transverse to the longitudinal axis of the furnace and with their minimum cross sectional dimension extending vertically. The bales being pushed through the furnace are adjacent each other and separation plates 173 are disposed between adjacent bales. The plates 173 distribute advancing forces applied to the bales by the ram and also transfer heat by conduction between the adjacent bales.

The floor may be formed by a plurality of rail-like skids 170A which extend longitudinally through the furnace and provide relatively evenly distributed support for bales which extend lengthwise across the skids.

The furnace 27B is provided with burners 174, 176, above and below the bales, respectively. The burners are oriented so that the flame cores impinge directly on the upper and lower faces of the bales. The furnace 27B does not employ side burners and because the bales are contiguous the side faces of the bales are not directly heated by the burner flames.

The separation plates are selected from materials which have a differential chemistry with respect to the bale materials so that the possibility of welding the separation plates to the bales is obviated. The separation plates are selected from materials which have chromium and nickel contents which are substantially different from the chromium and nickel content of the bale scraps. This prevents the separation plates from welding to the bales during heating. For example where the bales comprise mainly 1010 carbon steel scrap, stainless steel separation plates are preferably used. When the bales are ejected from the furnace, the separation plates are readily stripped from the bales.

The furnaces 27A or 27B are preferably operated at a positive pressure, e.g., 0.75 psi gauge, and are provided with suitably sealed entrance and exit doors, not shown, which can be the same as those disclosed in the parent application Ser. No. 122,110.

The elimination of a heating cycle in an oxidizing atmosphere contributes to minimizing the length of the heating cycle in the reducing atmosphere as well as providing for decarburization as is described previously. Heating bales in an oxidizing atmosphere results in the scale or oxide deposits forming on the scrap steel. The scale or oxides have an insulating effect and contribute to reductions in conductive and convective heat transfer to and within bales during the heating cycle. It has been found that heating of the surfaces of the bales in the reducing atmosphere is materially speeded by virtue of the absence of scale or oxides on the bales resulting from heating in oxidizing atmospheres.

IV. Bale Compaction

Figure 9:
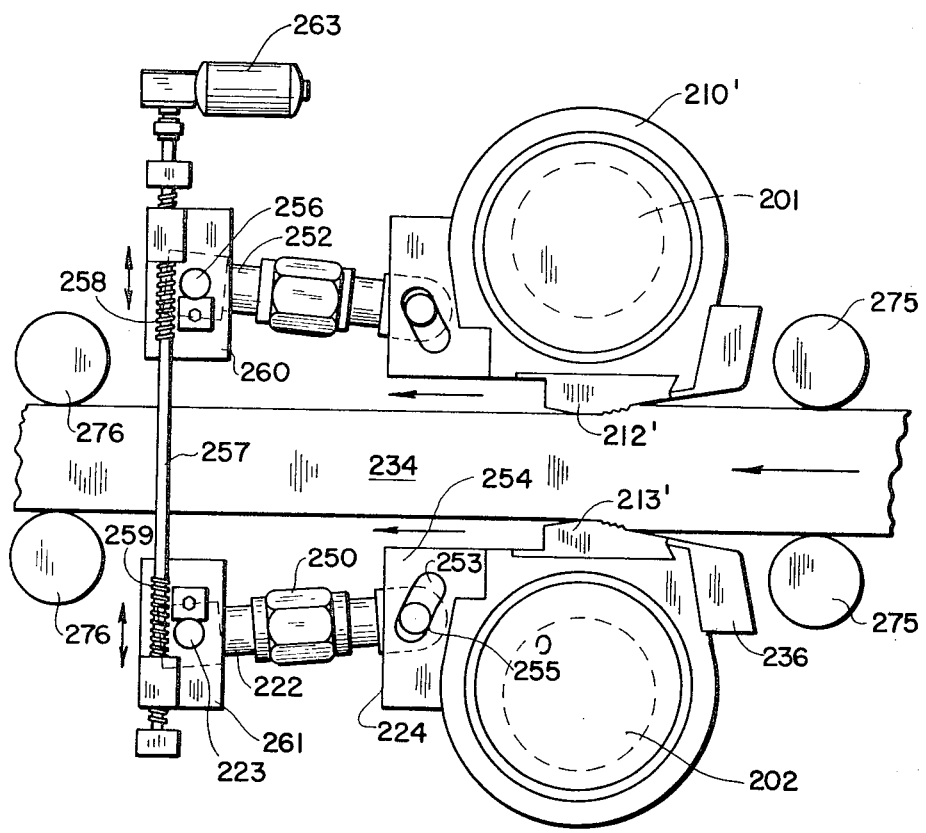
FIG. 9 is a schematic sectional view of the harmonic press showing in greater detail the adjustment means and the method of adjusting it.

FIG. 9 is a schematic sectional view of a harmonic press 200 for compacting the heated bales now indicated by the reference character 218. The press 200 is self feeding and imposes sudden, sharp impactions on the bales passing through it to reduce lateral force dissipation, break up and disperse dirt pieces on the bale and provide more localized force application to the bale. Referring to FIG. 9, a pair of eccentric shafts 201, 202 are journaled in a frame (not shown). Suitable gearing, not shown, is connected to the shafts 201, 202, respectively, to drive them in synchronized and opposite rotation.

The shafts 201, 202 have eccentric central portions to which platen supports 210, 211 are journaled, respectively. Platens 212, 213 are carried by the platen supports 210, 211, respectively. The platens are moved in an elliptical or air foil shaped path so that the bales are impacted and moved through the press by the action of the platens.

The path of travel of the platens is controlled during forging to eliminate unbalanced forces on the press and to optimize the impacting actions of the platens on the bales. A restraining rod is shown at 222 pivotally connected to the frame of the press at 223 and to the platen support 211 at 224. This latter connection to the platen support connects the restraining rod to the platen 213 to control the movment of the platen during a forging operation.

With the pivots positioned as shown in FIG. 9, the platen moves in a generally horizontally disposed elliptical path. By moving either or both of the pivots 223, 224, one is able to vary the motion transcribed by any given point on the platen 213 to adjust the forging action. Thus, if the pivot point 223 is moved downwardly and the pivot 224 is moved upwardly the path transcribed by a point on the platen assumes a generally vertical airfoil shape. Further adjusting movement of the pivots in these directions produces nearly vertical reciprocating movement of the platen.

The structure for accomplishing the pivot location adjustments also shown in FIG. 9. Since the upper platen is a mirror image of the lower, the previously described construction with respect to the lower platen will not be repeated.

The arm 222 includes an adjustment nut 250 for varying the length of the arm. As shown, this may be a manual adjustment. Obviously, servomotors may be mounted on the adjustment nut 250 and a corresponding adjustment nut 251 on corresponding upper restraining arm 252 to effect a remote control and automatic adjustment.

The pivot 224 rides in a curved slot, 253 in a platen attachment block 254. The pivot 224 may be secured in any suitable manner in an adjusted position such as by nut 255. Alternately, servomotors, or other remotely controllable mechanisms, can be used to adjust the arm-to-platen pivots.

The adjustment of the frame-to-arm pivot 223 and a corresponding upper pivot 256 is shown as controlled by a lead screw 257. The lead screw 257 has worm portions 258, 259 which threadably engage upper and lower adjustment blocks 260, 261. These adjustment blocks are suitably guided in the frame and move up and down to achieve the adjustment of the pivots 223, 256. The lead screw 257 is rotationally driven by motor 263 to provide synchronous adjustment of the pivots 223, 256. Feed pinch rolls are shown at 275 which feed the workpiece to the press. Delivery pinch rolls 276 are provided for removing a finished workpiece.

Compacted workpieces withdrawn from the press 200 are now ready for further finishing operations as desired, an example of which is the rolling operation depicted in FIG. 3.

The press 200 is only described briefly here and reference should be made to the parent application for a more complete understanding of the press construction and operation.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A method of producing carbon steel from scraps of ferrous material having a carbon content greater than the carbon content of the steel comprising:
   a. selecting scraps of ferrous material having a maximum thickness of about 0.10 inches;
   b. baling said scraps to produce a self supporting bale of interconnected pieces;
   c. compressing said bale to provide a density of no more than about 65% of the density of the solid mass of ferrous material having the same dimensions as said bale;
   d. heating said bale in a furnace having an effective temperature sufficiently great to heat the core of said bale to a temperature in excess of 1,300°F in no more than about 1.75 hours;
   e. maintaining a reducing atmosphere about said bale throughout heating; and,
   f. thereafter hot working said heated bale to produce a homogeneous solid steel workpiece.

2. The method of claim 1 wherein heating said bale comprises transferring heat to said bale core by conduction between interconnected and engaged pieces of scrap, convection currents of the furnace atmosphere flowing through the interstices of said bale and by radiation and reradiation.

3. The method of claim 2 wherein compressing said bale is controlled so that the compressed bale has an overall heat transfer coefficient of no less than about 70% that of steel.

4. The method of claim 1 wherein said furnace atmosphere contains at least 40% by volume of reducing agents comprising CO and $H_2$.

5. The method of claim 4 wherein said reducing atmosphere is maintained in a temperature range of from 2,000°–2,400°F.

6. The method of claim 1 wherein said bale core is heated to about 1,600°F.

7. The method of claim 1 wherein said furnace is fired by natural gas and oxygen, and further including controlling the quantity of oxygen provided for combustion to an amount less than the stoichiometric amount whereby to produce an atmoshpere in said furnace primarily comprising CO and $H_2$.

8. The method of claim 7 wherein the quantity of oxygen provided is limited to 45% – 50% of the stoichiometric quantity and the products of combustion comprise about 65 % reducing agents, by volume.

9. The method of claim 1 wherein said furnace is fired by natural gas and gas burners in the furnace are oriented to impinge the core of the burner flame on external surfaces of said bale.

10. The method of claim 1 wherein the density and gauge of said ferrous scraps are maintained uniform throughout said bale.

11. A method of forming a solid steel workpiece from steel scraps, comprising the steps of:
   a. selecting steel scraps having a gauge thickness of no more than about 0.1 inches;
   b. densifying the selected steel scraps to form an intertwined self-supporting mass with a density of no more than about 65% of the density of solid steel;
   c. decarburizing said mass while inhibiting the formation of scale and/or oxide formations by heating said mass in a reducing atmosphere until the coolest portion of said mass is at least about 1,300°F; and
   d. thereafter hot working said heated mass to produce a homogeneous solid steel workpiece.

12. The method of claim 11 wherein the heating of said mass is carried out within less than about 1.75 hours and manganese oxide migration is thus avoided.

13. The method of claim 11 wherein said reducing atmosphere is provided by combustion of natural gas with 45%-50% stoichiometric oxygen.

14. A method of forming a solid workpiece and ferrous metal from ferrous metal scraps, comprising the steps of:
   a. selecting ferrous metal scraps having a gauge thickness no greater than about 0.1 inches;
   b. forming a self-supporting compacted body of said selected scraps, said body being no greater than about 65% dense and being sufficiently porous throughout to allow heated gases to permeate the body and contact the individual scrap pieces;
   c. heating the porous body by subjecting it to a hot gaseous medium in the range of about 2,000°F to 2,400°F, said medium providing a reducing atmosphere, said heating being continued for a sufficient period of time to allow carbon and oxygen within said ferrous metal scraps to migrate to the surrounding gaseous medium; and
   d. thereafter hot working the heated body to produce a homogeneous solid workpiece.

15. The method of claim 14 wherein said gaseous medium contains at least 40% by volume of reducing agents selected from the group of CO and $H_2$.

16. The method of claim 14 wherein said gaseous medium has a pressure at least 0.75 psi above atmospheric pressure.

17. The method of claim 14 wherein said body attains a minimum temperature in its coldest portion of above about 1,300°F. during a period of no longer than about 1.75 hours while subjected to said hot gaseous medium.

18. The method of claim 14 wherein said body is subjected to convection, radiation, and conductivity in transferring heat from the outer surface of the body to inner portions thereof, said combined mechanisms of heat transfer providing a thermal conductivity relative to that of solid steel of at least 70%.

19. A method of forming a solid steel workpiece from steel scraps, comprising the steps of:
   a. selecting relatively thin scraps of steel typically having a gauge thickness of no more than about 0.10 inches;
   b. compacting the selected scraps into a self-supporting porous mass having a density of no more than about 65% of full density;
   c. introducing the compacted mass into a furnace;
   d. advancing the compacted mass through a succession of rest positions along a path of travel through said furnace;
   e. directing flames onto the top, bottom and side faces of the mass as it travels through said furnace to effect heating of the mass to at least about 1,300°F. in less than about 1.75 hours; and
   f. hot working the heated mass to form a solid homogeneous workpiece.

20. The method of claim 19 wherein said flames are produced in burners supplied with 45%-50% stoichiometric oxygen, and the atmosphere in said furnace is maintained at about 2,000°F. to 2,400°F.

21. The method of claim 3 wherein said furnace atmosphere contains at least 40% by volume of reducing agents comprising CO and $H_2$.

* * * * *

UNITED STATES PATENT OFFICE
CERTIFICATE OF CORRECTION

Patent No. 3,802,932      Dated April 9, 1974

Inventor(s) Mark E. Whalen and Joseph W. Malleck

It is certified that error appears in the above-identified patent and that said Letters Patent are hereby corrected as shown below:

Column 10, line 3, after the word "maximized" insert -- when the individual scrap piece thickness is minimized --

Column 10, line 5, et seq., delete "when the individual scrap piece thicknesses is minimized and that"

Signed and sealed this 3rd day of September 1974.

(SEAL)
Attest:

McCOY M. GIBSON, JR.
Attesting Officer

C. MARSHALL DANN
Commissioner of Patents